(12) United States Patent
Gui

(10) Patent No.: US 10,571,264 B2
(45) Date of Patent: Feb. 25, 2020

(54) SUPPORT LEG WEIGHING SENSOR

(71) Applicant: ANYLOAD YOUNGZON TRANSDUCER (HANGZHOU) CO., LTD., Hangzhou, Zhejiang (CN)

(72) Inventor: Yong Gui, Zhejiang (CN)

(73) Assignee: ANYLOAD YOUNGZON TRANSDUCER (HANGZHOU) CO., LTD., Hangzhou, Zhejiang (CN)

( * ) Notice: Subject to any disclaimer, the term of this patent is extended or adjusted under 35 U.S.C. 154(b) by 206 days.

(21) Appl. No.: 15/574,254

(22) PCT Filed: Feb. 24, 2016

(86) PCT No.: PCT/CN2016/074406
§ 371 (c)(1),
(2) Date: Nov. 15, 2017

(87) PCT Pub. No.: WO2016/184210
PCT Pub. Date: Nov. 24, 2016

(65) Prior Publication Data
US 2018/0135978 A1    May 17, 2018

(30) Foreign Application Priority Data

May 15, 2015 (CN) .................. 2015 2 0317410 U

(51) Int. Cl.
*G01B 21/32* (2006.01)
*G01G 23/06* (2006.01)
(Continued)

(52) U.S. Cl.
CPC ............. *G01B 21/32* (2013.01); *G01G 21/06* (2013.01); *G01G 21/23* (2013.01); *G01G 23/06* (2013.01)

(58) Field of Classification Search
CPC ........ G01B 21/32; G01G 21/06; G01G 21/23; G01G 23/06
(Continued)

(56) References Cited

U.S. PATENT DOCUMENTS 3,490,554 A * 1/1970 Schellentrager ....... G01G 21/23
177/253
3,915,248 A * 10/1975 Paelian .................. G01G 21/23
177/210 R (Continued)

FOREIGN PATENT DOCUMENTS

CN     200944057 Y     9/2007
CN     202013235 U     10/2011
(Continued)

OTHER PUBLICATIONS

Translation JP-11173904-A (Year: 1999).*

*Primary Examiner* — Natalie Huls
*Assistant Examiner* — Monica S Young
(74) *Attorney, Agent, or Firm* — Muncy, Geissler, Olds & Lowe, P.C.

(57) ABSTRACT

A support leg weighing sensor, comprising a support leg, a weighing sensor being arranged in the support leg, and the upper end of the support leg being provided with a connecting part connected to an object where the support leg is needed to be installed; an elastic body (40) in the weighing sensor is a section of the support leg; one end of the elastic body (40) has a concave spherical surface (5) or a concave arc surface; and the end, having the concave spherical surface (5) or the concave arc surface, of the elastic body is supported on a support ball (13) in the support leg, or the support ball (13) is supported on the concave spherical surface (5) or the concave arc surface. The support leg weighing sensor is capable of realizing weighing by means of a support leg; the support leg not only has functions of (Continued)

moving, supporting and adjusting equipment to be horizontal, but also is capable of weighing, such that a structure of an appliance provided with the support leg and having a weighing function is simplified; furthermore, weighing is carried out at the part of the support leg, such that an installation position error caused when a weighing sensor is installed in the appliance is avoided, and measurement is more accurate; and in addition, the support leg weighing sensor becomes a modular structure, and the support leg is manufactured by a weighing equipment manufacturer, such that the appliance which is provided with the support leg and has the weighing function is more convenient to install and maintain.

9 Claims, 3 Drawing Sheets

(51) Int. Cl.
*G01G 21/23* (2006.01)
*G01G 21/06* (2006.01)

(58) Field of Classification Search
USPC ............................................................ 73/132
See application file for complete search history.

(56) References Cited

U.S. PATENT DOCUMENTS

| | | | | |
|---|---|---|---|---|
| 4,285,412 A | | 8/1981 | Wirth | |
| 4,411,327 A | * | 10/1983 | Lockery | G01G 3/1402 177/211 |
| 5,600,104 A | * | 2/1997 | McCauley | G01G 19/12 177/136 |
| 5,801,339 A | * | 9/1998 | Boult | G01G 17/08 177/261 |
| 7,005,587 B2 | * | 2/2006 | Axakov | B60N 2/002 177/164 |
| 7,361,852 B2 | * | 4/2008 | Leahy | G01G 21/06 177/229 |
| 7,371,978 B2 | * | 5/2008 | Leahy | G01G 21/23 177/238 |
| 2016/0340156 A1 | * | 11/2016 | Ost | B66C 23/78 |

FOREIGN PATENT DOCUMENTS

| | | | |
|---|---|---|---|
| CN | 203148553 U | | 8/2013 |
| EP | 2362197 A1 | | 8/2011 |
| JP | 11173904 A | * | 7/1999 |
| JP | H 11173904 A | | 7/1999 |

* cited by examiner

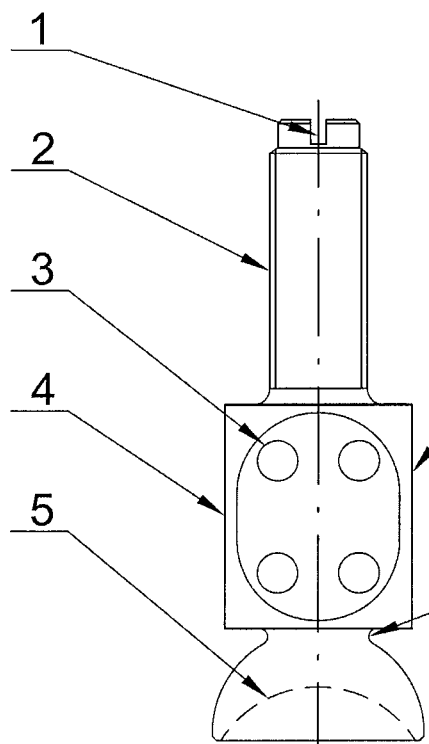
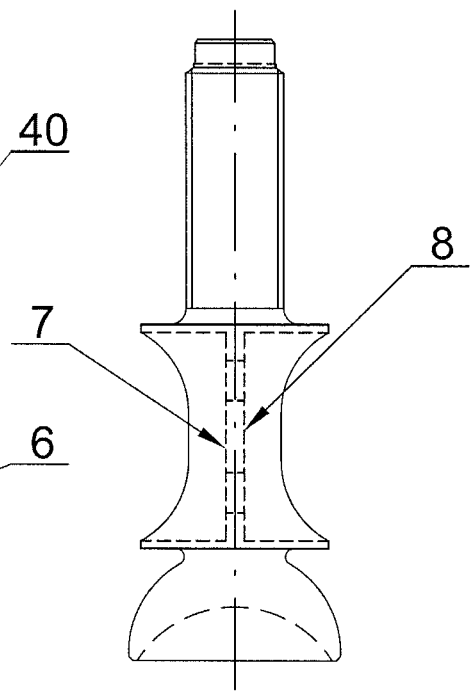
Fig. 1
Fig. 2
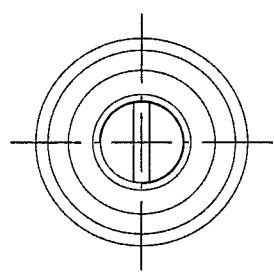
Fig. 3

SUPPORT LEG WEIGHING SENSOR

FIELD OF THE INVENTION

The present invention relates to a weighing measurement appliance, in particular to a support leg weighing sensor.

BACKGROUND

Currently, support leg supporting equipment are mostly used in platform scales, medical equipments, while sensors are fixed in the equipments for weighing. The support leg and weighing sensor are independent of each other. The equipment is additionally provided with corresponding structure to connect the weighing sensor, while the support leg is dedicated for moving, supporting and adjusting equipment to be horizontal.

SUMMARY

The technical problems to be solved in the invention is to provide a support leg weighing sensor, which can not only reduce the design complexity of equipment that needs to install weighing sensor, but also make these equipments easy to install and modify and guarantee adequate accuracy. To this end, the present invention adopts the following technical solutions:

A support leg weighing sensor, including a support leg, a weighing sensor being arranged in the support leg, and the upper end of the support leg being provided with a connecting part connected to an object where the support leg is needed to be installed; an elastic body in the weighing sensor is a section of the support leg; one end of the elastic body has a concave spherical surface or a concave arc surface; and the end, having the concave spherical surface or the concave arc surface, of the elastic body is supported on a support ball in the support leg, or the support ball is supported on the concave spherical surface or the concave arc surface.

Further, a concave spherical surface or a concave arc surface is provided at the lower end of the elastic body; the end, having the concave spherical surface or the concave arc surface, of the elastic body is supported on a support ball in the support leg, and the support leg is provided with a base of the support ball, the base is provided with a concave spherical surface or a concave arc surface; the support ball is rotatably located at the concave spherical surface or the concave arc surface at the lower end of the elastic body or the concave spherical surface or the concave arc surface between the blind hole and the base, the support leg weighing sensor is further provided with a fastening sleeve that is fixed on the support leg by the way of threaded screw or welding or other mechanical ways, and the fastening sleeve is used to connect the elastic body, the support ball and the base.

Further, another end of the elastic body is an external thread connecting part or an internal thread connecting part.

Further, another end of the elastic body is an external thread connecting part or an internal thread connecting part, which is used as the upper end of the support leg and a connecting part connected to an object where the support leg is needed to be installed.

Further, the elastic body has an oblong blind hole strain region.

Further, the fastening sleeve and the base are fixed by threaded screw or welding or other mechanical ways.

Further, the top end of the external thread connecting part is provided with a slot engaged with the tool. The slot may be a straight slot or a cross slot, etc.

Further, a round neck portion is provided between the strain region of the elastic body and concave spherical surface or the concave arc surface.

Further, a round neck portion is provided between the lower end of strain region of the elastic body and concave spherical surface or the concave arc surface. The diameter of the round neck portion is 0.8-1.2 times of the thread diameter of the external thread connecting part or the thread connecting part.

Further, the end of the elastic body where the concave spherical surface or the concave arc surface is provided can adopt a blind hole.

Further, the end of the base where the concave spherical surface or the concave arc surface is provided can adopt a blind hole.

Further, the support ball may be a swing rod that is provided with spherical surface or concave arc on both ends. Further, the swing rod can be moved within a certain range between the elastic body blind hole and the base blind hole, but it can automatically reset, to ensure that the force exerted is vertical.

The end of the elastic body provided with a concave spherical surface or a concave arc surface can directly adopt a convex spherical surface or a convex arc surface.

With the technical solutions used in the invention, the support leg weighing sensor is capable of realizing weighing by means of a support leg; the support leg not only has functions of moving, supporting and adjusting equipment to be horizontal, but also is capable of weighing, such that a structure of an appliance provided with the support leg and having a weighing function is simplified; furthermore, weighing is carried out at the part of the support leg, such that an installation position error caused when a weighing sensor is installed in the appliance is avoided, and measurement is more accurate; and in addition, the support leg weighing sensor becomes a modular structure, and the support leg is manufactured by a weighing equipment manufacturer, such that the appliance which is provided with the support leg and has the weighing function is more convenient to install and maintain.

BRIEF DESCRIPTION OF THE DRAWINGS

FIG. 1 is a schematic front view of Example 1 of the present invention, showing the structure of an elastic body of a support leg weighing sensor.

FIG. 2 is the left view of FIG. 1.

FIG. 3 is a top view of FIG. 1.

DETAILED DESCRIPTION

Example 1

Figure 4:
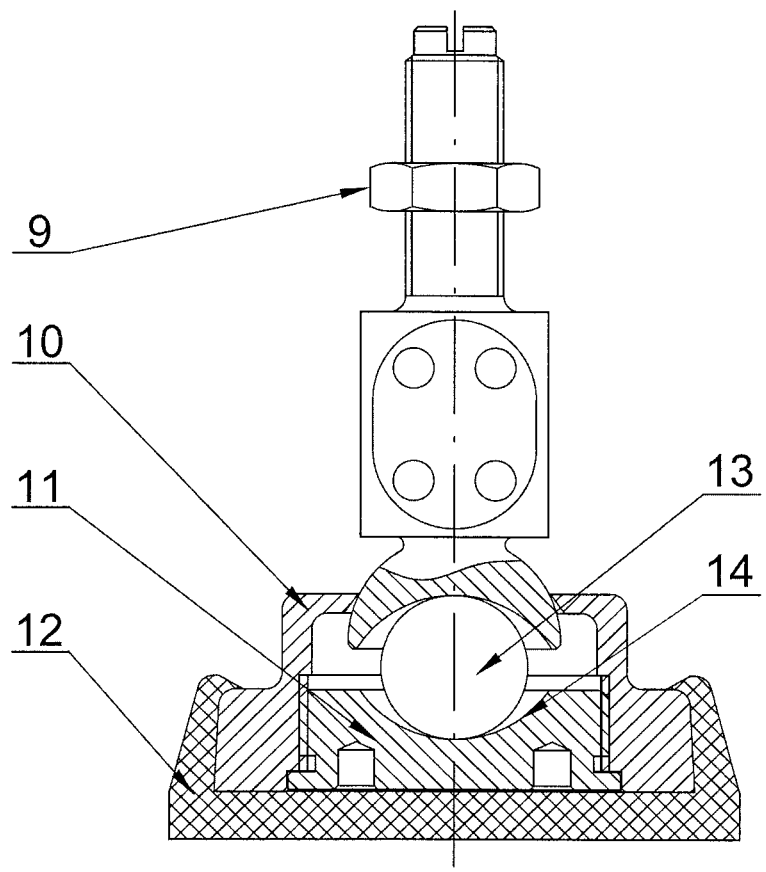
FIG. 4 is a schematic front view of Example 2 of the present invention, further showing the overall structure of a support leg on the basis of Example 1.

Refer to FIGS. 1, 2 and 3.

In this example, the elastic body 40 of weighing sensor is provided. On the front and back sides of the elastic body 40, strain regions 7 and 8 are provided, which are in oblong blind holes. On the upper and lower ends of the strain regions of the sensor are provided with four symmetrical through-holes 3, or not provided with through-holes.

The lower end of the elastic body is provided with a concave spherical surface 5; the upper end of the elastic body is an external thread connecting part 2; and at the top end of the external thread connecting part is provided with a slot 1.

The main body shape of the elastic body may be a circular cylinder or other cylinder shape. The main body shape of the strain region may be a circular cylinder or other polygonal cylinder, and the oblong blind hole is in the main body shape.

A round neck portion 6 is provided between the lower end of strain region of the elastic body and concave spherical surface 5, and the diameter of the round neck portion 6 is 0.8-1.2 times of the thread diameter of the external thread connecting part 2.

Example 2

Figure 5:
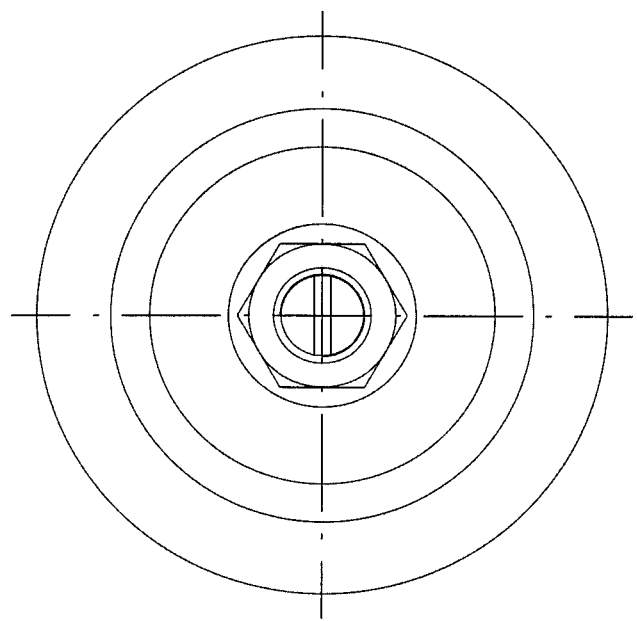
FIG. 5 is a top view of FIG. 4.
Figure 6:
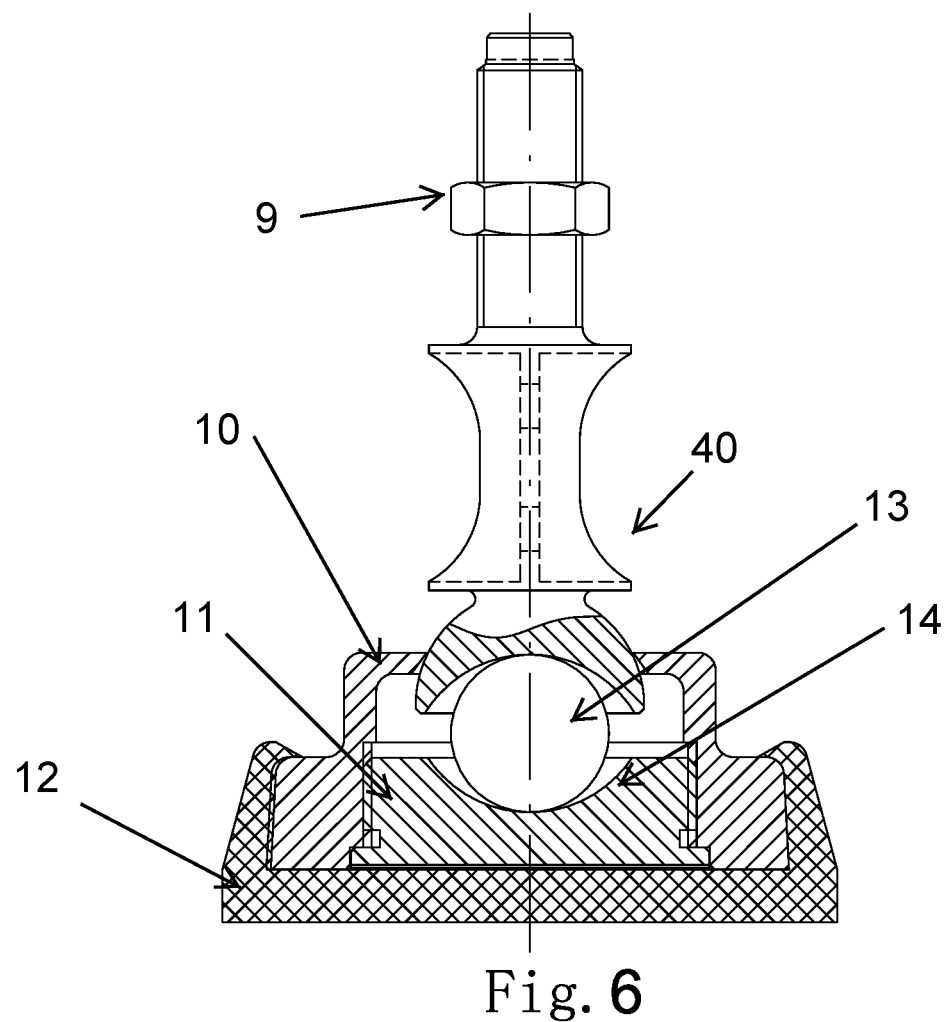
FIG. 6 is a left view of FIG. 4.

Refer to FIGS. 1, 2, 3, 4, 5 and 6.

In this Example, the structure of the support leg is further described on the basis of Example 1.

The elastic body 40 of the weighing sensor replaces a section of a routine support leg, to become a section of the support leg.

The end of the elastic body with the concave spherical surface 5 is supported on a support ball 13 of the support leg, and the support leg is provided with a base 11 that supports the support ball, and the base is provided with a concave spherical surface 14. The support ball 13 is rotatably located between the concave spherical surface 5 and the base concave spherical surface 14, the support leg weighing sensor is further provided with a fastening sleeve 10 that is fixed on the support leg by the way of threaded screw, and the fastening sleeve 10 is used to connect the elastic body 40, the support ball 13 and the base 11, to make elastic body 40 to move around support ball 13 within a certain range. The fastening sleeve is connected with the base by threaded connection.

The external thread connecting part 2 is also the upper end of the support leg and a connecting part connected to an object where the support leg is needed to be installed, provided with nut 9 above.

The support ball 13 may be a steel ball, and a rubber piece 12 is provided at the bottom of the support leg.

What is claimed is:

1. A support leg weighing sensor, comprising:
   a support leg, the support leg is the support leg of support leg supporting equipment;
   a weighing sensor being arranged in the support leg;
   a connecting part provided at an upper end of the support leg, the connecting part being configured to be connected to an object where the support leg is needed to be installed;
   an elastic body in the weighing sensor; a lower end of the elastic body has a concave spherical surface or a concave arc surface; and the lower end, having the concave spherical surface or the concave arc surface, of the elastic body is supported on a support ball in the support leg.

2. The support leg weighing sensor according to claim 1, wherein the concave spherical surface or the concave arc surface is provided at the lower end of the elastic body; the support leg is provided with a base of the support ball, the base is provided with a concave spherical surface or a concave arc surface; the support ball is rotatably located at the concave spherical surface or the concave arc surface at the lower end of the elastic body or the concave spherical surface or the concave arc surface between a blind hole and the base, the support leg weighing sensor further comprises a fastening sleeve that is fixed on the support leg by a threaded screw or welding or other mechanical ways, and the fastening sleeve is used to connect the elastic body, the support ball and the base.

3. The support leg weighing sensor according to claim 2, wherein the upper end of the elastic body is an external thread connecting part or an internal thread connecting part.

4. The support leg weighing sensor according to claim 3, wherein a top end of the external thread connecting part is provided with a slot.

5. The support leg weighing sensor according to claim 3, wherein a round neck portion is provided between a lower end of a strain region of the elastic body and the concave spherical surface or the concave arc surface, a diameter of the round neck portion is 0.8-1.2 times of a thread diameter of the external thread connecting part or the thread connecting part.

6. The support leg weighing sensor according to claim 2, wherein the upper end of the elastic body is an external thread connecting part or an internal thread connecting part, which is used as the upper end of the support leg and a connecting part connected to an object where the support leg is needed to be installed.

7. The support leg weighing sensor according to claim 2, wherein the concave spherical surface or the concave arc surface of the elastic body can adopt the blind hole, the concave spherical surface or the concave arc surface of the base can adopt the blind hole.

8. The support leg weighing sensor according to claim 1, wherein the elastic body has an oblong blind hole strain region.

9. The support leg weighing sensor according to claim 1, wherein a round neck portion is provided between a strain region of the elastic body and the concave spherical surface or the concave arc surface.

* * * * *